US008646901B2

(12) United States Patent
De Meutter et al.

(10) Patent No.: US 8,646,901 B2

(45) Date of Patent: Feb. 11, 2014

(54) SINGLE PASS INKJET PRINTING METHOD

(75) Inventors: Stefaan De Meutter, Antwerpen (BE); Peter Bracke, Drongen (BE); David Tilemans, Lier (BE); Joris Van Garsse, Mullem (BE); Geert Van Dyck, Ham (BE)

(73) Assignee: Agfa Graphics NV, Mortsel (BE)

( * ) Notice: Subject to any disclaimer, the term of this patent is extended or adjusted under 35 U.S.C. 154(b) by 49 days.

(21) Appl. No.: 13/505,747

(22) PCT Filed: Dec. 20, 2010

(86) PCT No.: PCT/EP2010/070180

§ 371 (c)(1),
(2), (4) Date: May 3, 2012

(87) PCT Pub. No.: WO2011/076703

PCT Pub. Date: Jun. 30, 2011

(65) Prior Publication Data

US 2012/0281034 A1 Nov. 8, 2012

Related U.S. Application Data

(60) Provisional application No. 61/292,184, filed on Jan. 5, 2010.

(30) Foreign Application Priority Data

Dec. 21, 2009 (EP) .................................... 09180074

(51) Int. Cl.
*B41J 2/01* (2006.01)
*B41J 29/38* (2006.01)
*G01D 11/00* (2006.01)

(52) U.S. Cl.
USPC ................ 347/102; 347/6; 347/100; 347/101

(58) Field of Classification Search
USPC ..................................... 347/6, 100, 101, 102
See application file for complete search history.

(56) References Cited

U.S. PATENT DOCUMENTS

| | | | | |
|---|---|---|---|---|
| 7,121,661 | B2 * | 10/2006 | Watanabe | 347/102 |
| 7,946,699 | B2 * | 5/2011 | Nakazawa et al. | 347/102 |

FOREIGN PATENT DOCUMENTS

| | | | |
|---|---|---|---|
| EP | 1 199 181 A2 | 4/2002 |
| EP | 1 645 605 A1 | 4/2006 |
| EP | 1 930 169 A1 | 6/2008 |
| EP | 2 053 104 A1 | 4/2009 |
| WO | 03/074619 A1 | 9/2003 |
| WO | 2004/002746 A1 | 1/2004 |

OTHER PUBLICATIONS

Official Communication issued in International Patent Application No. PCT/EP2010/070180, mailed on Jan. 31, 2011.

* cited by examiner

*Primary Examiner* — Jannelle M Lebron
(74) *Attorney, Agent, or Firm* — Keating & Bennett, LLP

(57) ABSTRACT

A single pass inkjet printing method includes the steps of: a) providing a radiation curable inkjet ink set containing at least a first and a second radiation curable inkjet ink having a dynamic surface tension of no more than 30 mN/m measured by maximum bubble pressure tensiometry at a surface age of 50 ms and at 25° C.; b) jetting a first radiation curable inkjet ink on an ink-jet ink-receiver moving at a printing speed of at least 35 m/min.; c) at least partially curing the first inkjet ink on the ink receiver within the range of 40 to 500 ms after the first inkjet ink landed on the ink receiver; d) jetting a second radiation curable inkjet ink on the at least partially cured first inkjet ink; and e) at least partially curing the second inkjet ink within the range of 40 to 500 ms after the second inkjet ink landed on the first inkjet ink.

15 Claims, No Drawings

SINGLE PASS INKJET PRINTING METHOD

CROSS-REFERENCE TO RELATED APPLICATIONS

This application is a 371 National Stage Application of PCT/EP2010/070180, filed Dec. 20, 2010. This application claims the benefit of U.S. Provisional Application No. 61/292,184, filed Jan. 5, 2010, which is incorporated by reference herein in its entirety. In addition, this application claims the benefit of European Application No. 09180074.8, filed Dec. 21, 2009, which is also incorporated by reference herein in its entirety.

BACKGROUND OF THE INVENTION

1. Field of the Invention

The present invention relates to high speed single pass inkjet printing methods exhibiting high image quality.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

In a single pass printing process, usually the ink-jet print heads cover the whole width of the ink-receiver and can thus remain stationary while the ink-receiver surface is transported under the ink-jet printing heads. This allows for high speed printing if good image quality is attainable on a wide variety of ink receivers.

The composition of the inkjet ink is dependent on the inkjet printing method used and on the nature of the ink-receiver to be printed. UV-curable inks are more suitable for non-absorbent ink-receivers than e.g. water or solvent based inkjet inks. However the behaviour and interaction of a UV-curable ink on a substantially non-absorbing ink-receiver was found to be quite complicated compared to water or solvent based inks on absorbent ink-receivers. In particular, a good and controlled spreading of the ink on the ink receiver is problematic.

EP 1199181 A (TOYO INK) discloses a method for ink-jet printing on a surface of a synthetic resin substrate comprising the steps of:

1. conducting a surface treatment to the surface so as to provide the surface with a specific surface free energy of 65-72 mJ/$m^2$ 2. providing an activation energy beam curable ink having a surface tension of 25-40 mN/m 3. discharging the ink onto the surface having the specific surface free energy with an ink-jet printing device thereby forming printed portions of said ink on the surface and 4. projecting an activation energy beam onto the printed portions.

The method of EP 1199181 A (TOYO INK) appears to teach that the surface energy of the ink-receiver surface should be greater than the surface energy of the ink. Yet in the examples, although the surface energy of the four untreated synthetic resin substrates (ABS, PBT, PE and PS) was higher than the surface energy of the four different inks, a good 'quality of image' i.e. good spreading of the ink was not observed. The surface treatments used in the examples to increase the surface free energy of the ink receiver were corona treatments and plasma treatments. Since the life-time of such surface treatments is rather limited, it is best to incorporate the surface treatment equipment into the inkjet printer which makes the printer more complex and expensive.

EP 2053104 A (AGFA GRAPHICS) discloses a radiation curable inkjet printing method for producing printed plastic bags using a single pass inkjet printer wherein a primed polymeric substrate has a surface energy $S_{sub}$ which is at least 4 mN/m smaller than the surface tension $S_{Liq}$ of the non-aqueous radiation curable inkjet liquid.

In general, the surface tension used to characterize an inkjet ink is its "static" surface tension. However, inkjet printing is a dynamic process wherein the surface tension changes dramatically over a time scale measured in tens of milliseconds. Surface active molecules diffuse to and orient themselves on newly formed surfaces at different speeds. Depending on the type of molecule and surrounding medium, they reduce the surface tension at different rates. Such newly formed surfaces include not only the surface of the ink droplet leaving the nozzle of a print head, but also the surface of the ink droplet landing on the ink receiver. The maximum bubble pressure tensiometry is the only technique that allows measurements of dynamic surface tensions of surfactant solutions in the short time range down to milliseconds. A traditional ring or plate tensiometer cannot measure these fast changes.

EP 1645605 A (TETENAL) discloses a radiation-hardenable inkjet ink wherein the dynamic surface tension within the first second has to drop at least 4 mN/m in order to improve the adhesion on a wide variety of substrates. According to paragraph [0026], the dynamic surface tension of the ink measured by maximum bubble pressure tensiometry was 37 mN/m at a surface age of 10 ms and 30 mN/m at a surface age of 1000 ms.

Spreading of a UV curable inkjet ink on an ink receiver can further be controlled by a partial curing or "pin curing" treatment wherein the ink droplet is "pinned", i.e. immobilized and no further spreading occurs. For example, WO 2004/002746 (INCA) discloses an inkjet printing method of printing an area of a substrate in a plurality of passes using curable ink, the method comprising depositing a first pass of ink on the area; partially curing ink deposited in the first pass; depositing a second pass of ink on the area; and fully curing the ink on the area.

WO 03/074619 (DOTRIX/SERICOL) discloses a single pass inkjet printing process comprising the steps of applying a first ink drop to a substrate and subsequently applying a second ink drop on to the first ink drop without intermediate solidification of the first ink drop, wherein the first and second ink drops have a different viscosity, surface tension or curing speed. In the examples, the use of a high-speed single pass inkjet printer was disclosed for printing UV-curable inks on a PVC substrate by a 'wet-on-wet printing' process, wherein the first/subsequent ink drops are not cured, i.e. they are not irradiated prior to application of the next ink drop. In this way an increase in the ink spreading can be realized due to the increased volume of ink of the combined ink drops on the substrate. However, although the spreading of the ink can be increased in this manner, neighbouring drops on the ink-receiver tend to coalescence and bleed into each other, especially on non-absorbing ink-receivers having a small surface energy.

Problems with gloss homogeneity are observed when the printing speed increases, such as e.g. in single pass inkjet printing. EP 1930169 A (AGFA GRAPHICS) discloses a UV-curable inkjet printing method using a first set of printing passes during which partial curing takes place, followed by a second set of passes during which no partial curing takes place for improving the gloss homogeneity.

Therefore it is desirable to be able to print inkjet images, especially on non-absorbing ink-receivers having a small surface energy, by single pass inkjet printing which exhibit sufficient ink spreading without requiring a surface treatment such as corona and while not exhibiting problems of coalescence, bleeding and gloss homogeneity.

SUMMARY OF THE INVENTION

It has been surprisingly discovered that single pass inkjet printed images were obtained which exhibited excellent image quality without requiring a surface treatment such as corona, even on non-absorbing ink-receivers having a small surface energy, by controlling the dynamic surface tension of the ink in combination with an at least partially curing treatment in a very short time frame after the droplet landed on the ink receiver.

In order to overcome the problems described above, preferred embodiments of the present invention provide a single pass inkjet printing method as defined below.

The above and other elements, features, steps, characteristics and advantages of the present invention will become more apparent from the following detailed description of the preferred embodiments.

DETAILED DESCRIPTION OF THE PREFERRED EMBODIMENTS

The term "radiation curable ink" means that the ink is curable by UV radiation or by e-beams.

The term "substantially non-absorbing ink-jet ink-receiver" means any ink-jet ink-receiver which fulfils at least one of the following two criteria:

1) No penetration of ink into the ink-jet ink-receiver deeper than 2 μm;

2) No more than 20% of a droplet of 100 pL jetted onto the surface of the ink-jet ink-receiver disappears into the ink-jet ink-receiver in 5 seconds. If one or more coated layers are present, the dry thickness should be less than 5 μm. Standard analytical method can be used by one skilled in the art to determine whether an ink-receiver falls under either or both of the above criteria of a substantially non-absorbing ink-receiver. For example, after jetting ink on the ink-receiver surface, a slice of the ink-receiver can be taken and examined by transmission electron microscopy to determine if the penetration depth of the ink is greater than 2 μm. Further information regarding suitable analytical methods can be found in the article: DESIE, G, et al. Influence of Substrate Properties in Drop on Demand Printing. *Proceedings of Imaging Science and Technology's* 18*th International Conference on Non Impact Printing.* 2002, p.360-365.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

Single Pass Inkjet Printing Methods

The single pass inkjet printing method according to a preferred embodiment of the present invention includes the steps of:

a) providing a radiation curable inkjet ink set containing at least a first and a second radiation curable inkjet ink having a dynamic surface tension of no more than 30 mN/m measured by maximum bubble pressure tensiometry at a surface age of 50 ms and at 25° C.;

b) jetting a first radiation curable inkjet ink on an ink-jet ink-receiver moving at a printing speed of at least 35 m/min.;

c) at least partially curing the first inkjet ink on the ink receiver within the range of 40 to 500 ms after the first inkjet ink landed on the ink receiver;

d) jetting a second radiation curable inkjet ink on the at least partially cured first inkjet ink; and e) at least partially curing the second inkjet ink within the range of 40 to 500 ms after the second inkjet ink landed on the first inkjet ink.

In a preferred embodiment of the single pass inkjet printing method, the ink-jet ink-receiver is a substantially non-absorbing ink-jet ink-receiver.

In a preferred embodiment of the single pass inkjet printing method, the ink-receiver is moving at a printing speed of at least 50 m/min.

In a preferred embodiment of the single pass inkjet printing method, the first and/or second inkjet ink is at least partially cured within the range of 40 to 420 ms, more preferably within the range of 50 to 200 ms.

In a preferred embodiment of the single pass inkjet printing method, the at least partially curing treatment of the first and/or second inkjet ink starts after at least 100 ms.

In a preferred embodiment of the single pass inkjet printing method, the partially cured first and second inkjet ink receive a final curing treatment within 2.5 s, more preferably within 2.0 s.

In a preferred embodiment of the single pass inkjet printing method, the surface of the ink receiver has a specific surface free energy of no more than 30 $mJ/m^2$.

Inkjet Printers

A suitable single pass inkjet printer according to a preferred embodiment of the present invention is an apparatus configured to perform the above single pass inkjet printing method.

The concept and construction of a single pass inkjet printer are well known to the person skilled in the art. An example of such a single pass inkjet printer is: Dotrix Modular from Agfa Graphics. A single pass inkjet printer for printing UV curable ink onto an ink-receiver typically contains one or more inkjet print heads, a device to transport the ink receiver beneath the print head(s), a curing device (UV or e-beam) and electronics to control the printing procedure.

The single pass inkjet printer is preferably at least capable of printing cyan (C), magenta (M), yellow (Y) and black (K) inkjet inks. In a preferred embodiment, the CMYK inkjet ink set used in the single pass inkjet printer may also be extended with extra inks such as red, green, blue, orange and/or violet to further enlarge the colour gamut of the image. The CMYK ink set may also be extended by the combination of full density and light density inks of both colour inks and/or black inks to improve the image quality by lowered graininess.

Inkjet Print Heads

The radiation curable inks may be jetted by one or more printing heads ejecting small droplets of ink in a controlled manner through nozzles onto an ink-receiving surface, which is moving relative to the printing head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the preferred embodiments of the present invention are not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the print head nozzle can form the necessary small droplets, a homogenous ink capable of rapid conversion to a dry printed area, etc.

In so-called multipass inkjet printers, the inkjet print head scans back and forth in a transversal direction across the moving ink-receiver surface, but in a "single pass printing process", the printing is accomplished by using page wide inkjet printing heads or multiple staggered inkjet printing heads which cover the entire width of the ink-receiver surface. In a single pass printing process the inkjet printing heads preferably remain stationary while the ink-receiver surface is transported under the inkjet printing head(s). All curable inks have then to be cured downstream of the printing area by a radiation curing device.

By avoiding the transversal scanning of the print head, high printing speeds can be obtained. In the single pass inkjet printing method according to a preferred embodiment of the present invention, the printing speed is at least 35 m/min, more preferably at least 50 m/min. The resolution of the single pass inkjet printing method according to a preferred embodiment of the present invention should preferably be at least 180 dpi, more preferably at least 300 dpi. The ink-receiver used in the single pass inkjet printing method according to a preferred embodiment of the present invention has preferably a width of at least 240 mm, more preferably the width of the ink-receiver is at least 300 mm, and particularly preferably at least 500 mm.

Curing Device

A suitable single pass inkjet printer according to a preferred embodiment of the present invention contains the necessary curing device for providing a partial and a final curing treatment. Radiation curable inks can be cured by exposing them to actinic radiation. These curable inks preferably comprise a photoinitiator which allows radiation curing, preferably by ultraviolet radiation.

In the preferred embodiment a static fixed radiation source is employed. The source of radiation arranged is preferably an elongated radiation source extending transversely across the ink-receiver surface to be cured and positioned down stream from the inkjet print head.

Many light sources exist in UV radiation, including a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm

UV-B: 320 nm to 290 nm

UV-C: 290 nm to 100 nm.

Furthermore, it is possible to cure the image using two different light sources differing in wavelength or illuminance. For example, the first UV-source for partial curing can be selected to be rich in UV-A, e.g. a lead-doped lamp and the UV-source for final curing can then be rich in UV-C, e.g. a non-doped lamp.

In a preferred embodiment of the apparatus configured to perform the single pass inkjet printing method according to a preferred embodiment of the present invention, the radiation curable inkjet inks receive a final curing treatment by e-beams or by a mercury lamp.

In a preferred embodiment of the apparatus configured to perform the single pass inkjet printing method according to a preferred embodiment of the present invention, the partial curing is performed by UV LEDs.

In preferred embodiments of the present invention partial curing is used to enhance the image quality of an inkjet image printed by a single pass inkjet printer using inkjet inks having a dynamic surface tension of no more than 30 mN/m measured by maximum bubble pressure tensiometry at a surface age of 50 ms and at 25°.

The terms "partial cure" and "full cure" refer to the degree of curing, i.e. the percentage of converted functional groups, and may be determined by for example RT-FTIR (Real-Time Fourier Transform Infra-Red Spectroscopy)—a method well known to the one skilled in the art of curable formulations. A partial cure is defined as a degree of curing wherein at least 5%, preferably 10%, of the functional groups in the coated formulation is converted. A full cure is defined as a degree of curing wherein the increase in the percentage of converted functional groups, with increased exposure to radiation (time and/or dose), is negligible. A full cure corresponds with a conversion percentage that is within 10%, preferably 5%, from the maximum conversion percentage defined by the horizontal asymptote in the RT-FTIR graph (percentage conversion versus curing energy or curing time).

For facilitating curing, the inkjet printer preferably includes one or more oxygen depletion units. A preferred oxygen depletion unit places a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Inkjet Inks

The radiation curable inks used in the single pass inkjet printing method according to a preferred embodiment of the present invention are preferably UV radiation curable inkjet inks. The curable inks preferably contain at least one photoinitiator.

In a radiation curable inkjet ink set for a single pass inkjet printing method preferably all the inks have a dynamic surface tension of no more than 30 mN/m measured by maximum bubble pressure tensiometry at a surface age of 50 ms and at 25° C.

The radiation curable inkjet inks preferably contain one or more colorants, more preferably one or more colour pigments. The curable inkjet ink set preferably comprises at least one yellow curable inkjet ink (Y), at least one cyan curable inkjet ink (C) and at least one magenta curable inkjet ink (M) and preferably also at least one black curable inkjet ink (K). The curable CMYK inkjet ink set may also be extended with extra inks such as red, green, blue, orange and/or violet to further enlarge the colour gamut of the image. The CMYK ink set may also be extended by the combination of full density and light density inks of both colour inks and/or black inks to improve the image quality by lowered graininess.

The radiation curable inkjet ink preferably also contains at least one surfactant, so that the inkjet ink has a dynamic surface tension of no more than 30 mN/m measured by maximum bubble pressure tensiometry at a surface age of 50 ms and at 25° C.

The radiation curable inkjet ink is a non-aqueous inkjet ink. The term “non-aqueous” refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks instable, preferably the water content is less than 1 wt % based on the total weight dispersion medium and most preferably no water at all is present.

The radiation curable inkjet ink preferably does not contain an evaporable component such as an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC, and preferably 0.1-10.0 wt %, and particularly preferably 0.1-5.0 wt %, each based on the total weight of the curable ink.

The pigmented radiation curable inkjet ink preferably contains a dispersant, more preferably a polymeric dispersant, for dispersing the pigment. The pigmented curable ink may contain a dispersion synergist to improve the dispersion quality of the ink. Preferably, at least the magenta ink contains a dispersion synergist. A mixture of dispersion synergists may be used to further improve dispersion stability.

The viscosity of the radiation curable inkjet inks is preferably smaller than 100 mPa·s at 30° C. and at a shear rate of 100 $s^{-1}$. The viscosity of the inkjet ink at the jetting temperature is preferably smaller than 30 mPa·s, more preferably lower than 15 mPa·s, and most preferably between 2 and 10 mPa·s at a shear rate of 100 $s^{-1}$ and a jetting temperature between 10 and 70° C.

The radiation curable inkjet ink may further also contain at least one inhibitor.

Surfactants

Surfactants are known for use in inkjet inks to reduce the surface tension of the ink and to reduce the contact angle on the substrate, i.e. to improve the wetting of the substrate by the ink. On the other hand, the inkjet ink must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

The radiation curable inks used in the single pass inkjet printing method according to a preferred embodiment of the present invention preferably have a dynamic surface tension of no more than 30 mN/m, and preferably also a static surface tension of no more than 24 mN/m, more preferably a static surface tension of no more than 22 mN/m.

The radiation curable inks used in the single pass inkjet printing method according to a preferred embodiment of the present invention preferably contain silicone surfactants because the low dynamic surface tensions can be easier and better controlled with silicone surfactants than with fluorinated surfactants.

The surfactant(s) can be anionic, cationic, non-ionic, or zwitter-ionic and are usually added in a total quantity less than 10 wt % based on the total weight of the radiation curable inks and particularly in a total less than 5 wt % based on the total weight of the radiation curable ink.

In a preferred embodiment, radiation curable inks used in the single pass inkjet printing method according to a preferred embodiment of the present invention contain at least 0.6 wt % of silicone surfactant based on the total weight of the ink, more preferably at least 1.0 wt % of silicone surfactant based on the total weight of the ink.

The silicone surfactants are typically siloxanes and can be alkoxylated, polyether modified, polyether modified hydroxy functional, amine modified, epoxy modified and other modifications or combinations thereof. Preferred siloxanes are polymeric, for example polydimethylsiloxane The radiation curable inks used in the single pass inkjet printing method according to a preferred embodiment of the present invention preferably contain a polyether modified polydimethylsiloxane surfactant.

In radiation curable inks used in the single pass inkjet printing method according to a preferred embodiment of the present invention, a fluorinated or silicone compound may be used as a surfactant, however, a cross-linkable surfactant is preferred, especially for food packaging applications. It is therefore preferred to use a polymerizable surfactant, i.e. a copolymerizable monomer having surface-active effects, for example, silicone modified acrylates, silicone modified methacrylates, acrylated siloxanes, polyether modified acrylic modified siloxanes, fluorinated acrylates, and fluorinated methacrylates; these acrylates can be mono-, di-, tri- or higher functional (meth)acrylates.

The radiation curable inks used in the single pass inkjet printing method according to a preferred embodiment of the present invention preferably contain a polymerizable silicone surfactant.

In a preferred embodiment of the single pass inkjet printing method according to a preferred embodiment of the present invention, the polymerizable silicone surfactant is a silicone modified (meth)acrylate or a (meth)acrylated siloxane.

Examples of suitable commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including TEGO RAD™2100, 2200N, 2250, 2300, 2500, 2600 and 2700), EBECRYL™1360 a polysilixone hexaacrylate from CYTEC INDUSTRIES BV and Efka™-3000 series (including EFKA™-3232 and EFKA™-3883) from EFKA CHEMICALS B.V..

Monomers and Oligomers

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the radiation curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310,115 (AGFA), incorporated herein by reference. Particularly preferred compounds are 2-(2-vinyloxyethoxy)ethyl(meth) acrylate, most preferably the compound is 2-(2-vinyloxyethoxy)ethyl acrylate.

Colorants

Colorants used in the radiation curable inks may be dyes, pigments or a combination thereof. Organic and/or inorganic pigments may be used. The colorant is preferably a pigment or a polymeric dye, most preferably a pigment.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548 (AGFA GRAPHICS).

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is CINQUASIA™ Magenta RT-355-D from Ciba Specialty Chemicals.

Also mixtures of pigments may be used in the pigment dispersions. For some inkjet applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, but mainly also because very small pigment particles or individual pigment molecules thereof may still be extracted in food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment dispersions, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The pigments are present in the range of 0.01 to 15%, more preferably in the range of 0.05 to 10% by weight and most preferably in the range of 0.1 to 5% by weight, each based on the total weight of the pigment dispersion. For white pigment dispersions, the white pigment is preferably present in an amount of 3% to 30% by weight of the pigment dispersion, and more preferably 5% to 25%. An amount of less than 3% by weight cannot achieve sufficient covering power and usually exhibits very poor storage stability and ejection property.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;

SOLSPERSE™ dispersants available from NOVEON;

TEGO™ DISPERS™ dispersants from EVONIK;

EDAPLAN™ dispersants from MÜNZING CHEMIE;

ETHACRYL™ dispersants from LYONDELL;

GANEX™ dispersants from ISP;

DISPEX™ and EFKA™ dispersants from CIBA SPECIALTY CHEMICALS INC;

DISPONER™ dispersants from DEUCHEM; and

JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH. Particularly preferred dispersants are SOLSPERSE™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist exhibiting a certain molecular similarity with the color pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. SOLSPERSE™5000 from NOVEON is preferred. Suitable dispersion synergists for yellow inkjet inks include those disclosed in EP 1790697 A (AGFA GRAPHICS).

Photoinitiators

The photoinitiator is preferably a free radical initiator. A free radical photoinitiator is a chemical compound that initiates a polymerization of monomers and oligomers when exposed to actinic radiation by the formation of a free radical.

Two types of free radical photoinitiators can be distinguished and used in the pigment dispersion or ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Suitable photo-initiators are disclosed in CRIVELLO, J. V., et al. VOLUME III: Photoinitiators for Free Radical Cationic. 2nd edition. Edited by BRADLEY, G.. London, UK: John Wiley and Sons Ltd, 1998. p.287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™500, IRGACURE™ 907, IRGACURE™369, IRGACURE™1700, IRGACURE™ 651, IRGACURE™ 819, IRGACURE™ 1000, IRGACURE™1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™470X available from SPECTRA GROUP Ltd.

Suitable cationic photo-initiators include compounds, which form aprotic acids or Bronsted acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulfonium salts, triarylselenonium salts and the like.

However for safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

A preferred amount of photoinitiator is 0-50 wt %, more preferably 0.1-20 wt %, and most preferably 0.3-15 wt % of the total weight of the curable pigment dispersion or ink.

In order to increase the photosensitivity further, the radiation curable ink may additionally contain co-initiators. Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl(meth) acrylates (e.g., diethylaminoethylacrylate) or N-morpholinoalkyl-(meth)acrylates (e.g., N-morpholinoethyl-acrylate).
The preferred co-initiators are aminobenzoates.

When one or more co-initiators are included into the radiation curable ink, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The radiation curable ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn A G; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total inkjet ink.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical devices and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

EXAMPLES

Measurement Methods

1. Bleeding

The inter-colour bleeding of inks occurs when two colours overlap and create unwanted colour mixing. Bleeding was evaluated by printing 100 μm lines of one colour in a large printed area of another colour, e.g. a black line in a large yellow area. The evaluation was made in accordance with a criterion as described in Table 1.

TABLE 1

| Criterion | Observation |
|---|---|
| ++ | no bleeding |
| + | almost no bleeding visible by microscope |
| – | bleeding visible by microscope |
| –– | some bleeding to be seen by the naked eye |
| ––– | bleeding to be seen by the naked eye |

2. Coalescence

The ink-jet ink-receiver must be readily wetted by the inkjet inks so that there is no "puddling", i.e. coalescence of adjacent ink-droplets to form large drops on the surface of the ink-jet ink-receiver. A visual evaluation was made in accordance with a criterion described in Table 2.

TABLE 2

| Criterion | Observation |
|---|---|
| ++ | no coalescence |
| + | almost no coalescence |
| – | coalescence |
| –– | almost full coalescence |
| ––– | full coalescence |

3. Gloss

A square patch of 10×10 μm of red, of green and of blue was printed. Differences in the spreading and curing of the inkjet inks lead to inhomogeneities in gloss which are visible by the naked eye. A visual evaluation was made in accordance with a criterion described in Table 3.

TABLE 3

| Criterion | Observation |
|---|---|
| ++ | no inhomogeneities in gloss visible |
| + | almost no inhomogeneities in gloss visible |
| – | small inhomogeneities in gloss visible |
| –– | large inhomogeneities in gloss visible |
| ––– | very large inhomogeneities in gloss visible |

4. Dynamic Surface Tension

The dynamic surface tension (DST) was measured using a Bubble Pressure Tensiometer BP2 available from KRÜSS. The inkjet ink was placed in a thermostatic vessel of the tensiometer at a temperature of 25° C. A silanized, glass capillary with a capillary radius 0.221 mm was immersed to a depth of 10 mm in the ink. The surface tension was measured as a function of surface age using Labdesk software and using air as the gas for creating the bubbles.

5. Static Surface Tension

The static surface tension of the curable liquids and inks were measured with a KRÜSS tensiometer K9 from KRÜSS GmbH, Germany at 25° C. after 60 seconds.

6. Surface Energy

The surface energy of a substrate was measured using a set of test pens, containing fluids of a defined surface tension from 30 to 44 mN/m, available from ARCOTEST, Germany.

A surface energy measurement result of 36-38 mJ/$m^2$ (=mN/m) means that the red ink of a test pen with a surface tension of 36 mN/m results in spreading of the red ink, while the red ink of a test pen with a surface tension of 38 mN/m results did not result in spreading of the red ink.

Materials

All materials used in the following examples were readily available from Aldrich Chemical Co. (Belgium) or Acros Organics (Belgium) unless otherwise specified. The "water" used in the examples was demineralized water.

VEEA is 2-(vinylethoxy)ethyl acrylate, a difunctional monomer available from NIPPON SHOKUBAI, Japan:

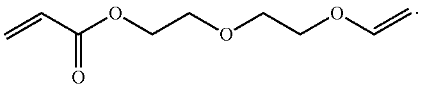

DPGDA is dipropyleneglycoldiacrylate from SARTOMER.

M600 is dipentaerythritol hexaacrylate and an abbreviation for MIRAMER™ M600 available from RAHN AG.

ITX is DAROCUR™ ITX is an isomeric mixture of 2- and 4-isopropylthioxanthone from CIBA SPECIALTY CHEMICALS.

IRGACURE™ 819 is a photoinitiator available from CIBA SPECIALTY having as chemical structure:

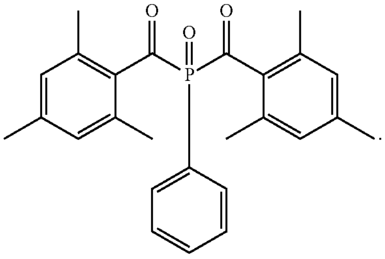

IRGACURE™ 379 is a photoinitiator available from CIBA SPECIALTY having as chemical structure:

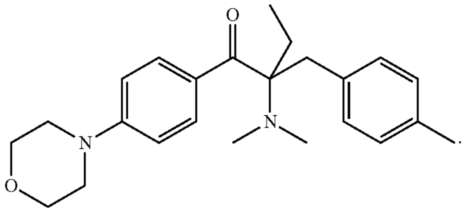 [SMILES: CCC(Cc1ccc(C)cc1)(C(=O)c1ccc(N2CCOCC2)cc1)N(C)C]

IRGACURE™ 907 is 2-methyl-1-[4-(methylthio)phenyl]-2-morpholino-propan-1-one, a photoinitiator available from CIBA SPECIALTY CHEMICALS.

PB15:4 is an abbreviation used for HOSTAPERM™ Blue P-BFS, a C.I. Pigment Blue 15:4 pigment from CLARIANT.

PY150 is an abbreviation used for Chromophtal™ Yellow LA2, a C.I. Pigment Yellow 150 FROM CIBA SPECIALTY CHEMICALS.

PV19/PR202 is CROMOPHTAL™ Jet Magenta 2BC which is a mixed crystal of C.I. Pigment Violet 19 and C.I. Pigment Red 122 available from CIBA-GEIGY.

PB7 is an abbreviation used for Special Black™ 550, which is a carbon black available from EVONIK DEGUSSA.

SOLSPERSE™ 35000 is a polyethyleneimine-polyester hyperdispersant from NOVEON.

S35000 is a 35% Solution of SOLSPERSE™ 35000 in DPGDA.

SYN is the dispersion synergist according to Formula (A):

Formula (A)

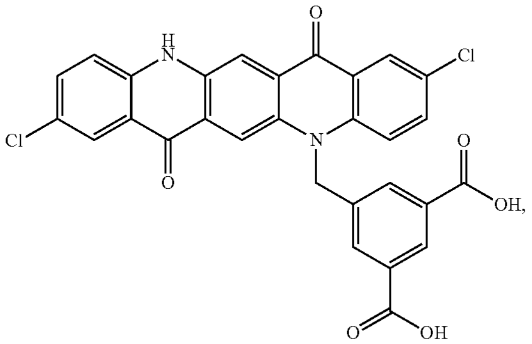

and was synthesized in the same manner as described in Example 1 of WO 2007/060254 (AGFA GRAPHICS) for the synergist QAD-3. BYK™ UV3510 is a polyether modified polydimethylsiloxane wetting agent available from BYK CHEMIE GMBH.

INHIB is a mixture forming a polymerization inhibitor having a composition according to Table 4.

TABLE 4

| Component | wt % |
| --- | --- |
| DPGDA | 82.4 |
| p-methoxyphenol | 4.0 |
| 2,6-di-tert-butyl-4-methylphenol | 10.0 |
| CUPFERRON ™ AL | 3.6 |

CUPFERRON™ AL is aluminum N-nitrosophenylhydroxylamine from WAKO CHEMICALS LTD.

HIFI is a substantially non-absorbing polyester film available as HIFI™ PMX749 from HiFi Industrial Film(UK), which has a surface energy of 37 mJ/$m^2$.

IG is a bleached cardboard available as INVERCOTE™ G (180 g/$m^2$) from Iggesund Paperboard AB (Sweden), which has a surface energy of 45 mJ/$m^2$.

Inkjet Printer

A custom built single pass inkjet printer was used, which had an undercarriage on which a linear motor was mounted. The sled of the linear motor was attached to a substrate table. Ink-receivers are held in place on the substrate table by a vacuum suction system. A bridge was built on the undercarriage perpendicular to the direction of the linear motor. Connected to the bridge a cage for four inkjet print heads (KJ4A type from Kyocera) was mounted. This cage was provided with the necessary mechanical adjustment device to align the print heads such that they could one by one print the same surface on the substrate table moving beneath them in a single pass.

The linear motor and the inkjet printheads were controlled by a specific program and separate electronic circuits. The synchronization between the linear motor and the inkjet printheads was possible because the encoder pulses of the linear motor were also fed to the electronic circuits that controlled the inkjet print heads. The firing pulses of the inkjet print heads were supplied synchronously with the encoder pulses of the linear motor and thus in this manner the movement of the substrate table was synchronized with the inkjet print head. The software driving the printheads could translate any CMYK encoded image into control signals for the print heads.

The UV curing device encompassed five mercury vapor lamps. These lamps were moveable connected to two fixed rails. Four lead doped mercury vapor lamps were each placed immediately after one of the four inkjet print head for pin curing. The fifth undoped mercury vapor lamp was positioned at the end of the two fixed rails after the substrate table had passed the four inkjet printheads and their lead doped mercury vapor lamps, in order to provide a final cure. All these lamps were individually adjustable in terms of guidance and outputted power UV light. By positioning the lead doped mercury vapor lamps closer or further away from the print head, the time to cure after jetting could be decreased respectively increased.

Each print head had its own ink supply. The main circuit was a closed loop, wherein circulation was provided by a pump. This circuit started from a header tank, mounted in the immediate vicinity of the inkjet print head, to a degassing membrane and then through a filter and the pump back to the header tank. The membrane was impervious to ink but permeable to air. By applying a strong pressure on one side of the membrane, air was drawn from the ink located on the other side of the membrane.

The function of the header tank is threefold. The header tank contains a quantity of permanently degassed ink that could be delivered to the inkjet print head. Secondly, a small underpressure was exerted in the header tank to prevent ink leakage from the print head and to form a meniscus in the ink jet nozzle. The third function was that by using a float in the header tank the ink level in the circuit could be monitored.

Furthermore, two short channels were connected to the closed loop: one input channel and one output channel. On a signal from the float in the header tank, a quantity of ink from an ink storage container was brought via the input channel into the closed circuit just before the degassing membrane. The short output channel ran from the header tank to the inkjet print head, where the ink was consumed, i.e. jetted on the ink receiver.

Inkjet Inks

The preparation of the concentrated pigment dispersions for the CMYK inkjet ink sets were all prepared in a similar way.

Preparation of Concentrated Cyan Pigment Dispersion DIS-C

A concentrated cyan pigment dispersion DIS-C was prepared by mixing for 30 minutes the components according to Table 5 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 5

| Component | Quantity (in g) |
|---|---|
| PB15: 4 | 1400 |
| S35000 | 4000 |
| INHIB | 70 |
| DPGDA | 1530 |

Preparation of Concentrated Magenta Pigment Dispersion DIS-M

A concentrated magenta pigment dispersion DIS-M was prepared by mixing for 30 minutes the components according to Table 6 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 6

| Component | Quantity (in g) |
|---|---|
| PV19/PR202 | 1050 |
| SYN | 15 |
| S35000 | 3000 |
| INHIB | 70 |
| DPGDA | 2865 |

Preparation of Concentrated YellowPigment Dispersion DIS-Y

A concentrated yellow pigment dispersion DIS-Y was prepared by mixing for 30 minutes the components according to Table 7 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 7

| Component | Quantity (in g) |
|---|---|
| PY150 | 1050 |
| S35000 | 3000 |
| INHIB | 70 |
| DPGDA | 2880 |

Preparation of Concentrated Black Pigment Dispersion DIS-K

A concentrated black pigment dispersion DIS-K was prepared by mixing for 30 minutes the components according to Table 8 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 8

| Component | Quantity (in g) |
|---|---|
| PB7 | 1050 |
| S35000 | 3000 |
| INHIB | 70 |
| DPGDA | 2880 |

Preparation of Inkjet Inksets Set-1 to Set-4

All inkjet inks were prepared in the same way. For example, the cyan inkjet ink C-1 was prepared by combining the concentrated cyan pigment dispersion DIS-C with monomers, photoinitiators, surfactant, . . . to obtain the composition given for inkjet ink C-1 in Table 9.

In the inkjet inkset Set-1 of Table 9, all inkjet inks have a static surface tension of 22 mN/m and a dynamic surface tension of 40 mN/m.

TABLE 9

| wt % of | C-1 | M-1 | Y-1 | K-1 |
|---|---|---|---|---|
| VEEA | 62.34 | 63.45 | 63.59 | 62.34 |
| DPGDA | 12.56 | 14.60 | 11.31 | 12.56 |
| M600 | 6.00 | 1.80 | 6.60 | 6.00 |
| ITX | 2.00 | 2.00 | 2.00 | 2.00 |
| IRGACURE ™ 819 | 3.00 | 3.00 | 3.00 | 3.00 |
| IRGACURE ™ 907 | 5.00 | 5.00 | 5.00 | 5.00 |
| IRGACURE ™ 379 | 2.00 | 2.00 | 2.00 | 2.00 |
| PB15: 4 | 3.00 | — | | 0.80 |
| PV19/PR202 | — | 3.50 | — | — |
| PY150 | — | — | 2.70 | — |
| PB7 | — | — | — | 2.20 |
| SYN | — | 0.05 | — | — |
| S35000 | 3.00 | 3.50 | 2.70 | 3.00 |
| INHIB | 1.00 | 1.00 | 1.00 | 1.00 |
| BYK ™ UV3510 | 0.10 | 0.10 | 0.10 | 0.10 |

In the inkjet inkset Set-2 of Table 10, all inkjet inks have a static surface tension of 22 mN/m and a dynamic surface tension of 31 mN/m.

TABLE 10

| wt % of | C-2 | M-2 | Y-2 | K-2 |
|---|---|---|---|---|
| VEEA | 62.14 | 63.25 | 63.39 | 62.14 |
| DPGDA | 12.56 | 14.60 | 11.31 | 12.56 |
| M600 | 6.00 | 1.80 | 6.60 | 6.00 |
| ITX | 2.00 | 2.00 | 2.00 | 2.00 |
| IRGACURE ™ 819 | 3.00 | 3.00 | 3.00 | 3.00 |
| IRGACURE ™ 907 | 5.00 | 5.00 | 5.00 | 5.00 |
| IRGACURE ™ 379 | 2.00 | 2.00 | 2.00 | 2.00 |
| PB15: 4 | 3.00 | — | — | 0.80 |
| PV19/PR202 | — | 3.50 | — | — |
| PY150 | — | — | 2.70 | — |
| PB7 | — | — | — | 2.20 |
| SYN | — | 0.05 | — | — |

TABLE 10-continued

| wt % of | C-2 | M-2 | Y-2 | K-2 |
|---|---|---|---|---|
| S35000 | 3.00 | 3.50 | 2.70 | 3.00 |
| INHIB | 1.00 | 1.00 | 1.00 | 1.00 |
| BYK ™ UV3510 | 0.30 | 0.30 | 0.30 | 0.30 |

In the inkjet inkset Set-3 of Table 11, all inkjet inks have a static surface tension of 22 mN/m and a dynamic surface tension of 30 mN/m.

TABLE 11

| wt % of | C-3 | M-3 | Y-3 | K-3 |
|---|---|---|---|---|
| VEEA | 61.84 | 62.95 | 63.09 | 61.84 |
| DPGDA | 12.56 | 14.60 | 11.31 | 12.56 |
| M600 | 6.00 | 1.80 | 6.60 | 6.00 |
| ITX | 2.00 | 2.00 | 2.00 | 2.00 |
| IRGACURE ™ 819 | 3.00 | 3.00 | 3.00 | 3.00 |
| IRGACURE ™ 907 | 5.00 | 5.00 | 5.00 | 5.00 |
| IRGACURE ™ 379 | 2.00 | 2.00 | 2.00 | 2.00 |
| PB15: 4 | 3.00 | — | — | 0.80 |
| PV19/PR202 | — | 3.50 | — | — |
| PY150 | — | — | 2.70 | — |
| PB7 | — | — | — | 2.20 |
| SYN | — | 0.05 | — | — |
| S35000 | 3.00 | 3.50 | 2.70 | 3.00 |
| INHIB | 1.00 | 1.00 | 1.00 | 1.00 |
| BYK ™ UV3510 | 0.60 | 0.60 | 0.60 | 0.60 |

In the inkjet inkset Set-4 of Table 12, all inkjet inks have a static surface tension of 22 mN/m and a dynamic surface tension of 28 mN/m.

TABLE 12

| wt % of | C-4 | M-4 | Y-4 | K-4 |
|---|---|---|---|---|
| VEEA | 61.44 | 62.55 | 62.69 | 61.44 |
| DPGDA | 12.56 | 14.60 | 11.31 | 12.56 |
| M600 | 6.00 | 1.80 | 6.60 | 6.00 |
| ITX | 2.00 | 2.00 | 2.00 | 2.00 |
| IRGACURE ™ 819 | 3.00 | 3.00 | 3.00 | 3.00 |
| IRGACURE ™ 907 | 5.00 | 5.00 | 5.00 | 5.00 |
| IRGACURE ™ 379 | 2.00 | 2.00 | 2.00 | 2.00 |
| PB15: 4 | 3.00 | — | — | 0.80 |
| PV19/PR202 | — | 3.50 | — | — |
| PY150 | — | — | 2.70 | — |
| PB7 | — | — | — | 2.20 |
| SYN | — | 0.05 | — | — |
| S35000 | 3.00 | 3.50 | 2.70 | 3.00 |
| INHIB | 1.00 | 1.00 | 1.00 | 1.00 |
| BYK ™ UV3510 | 1.00 | 1.00 | 1.00 | 1.00 |

Results and Evaluation

The inkjet inksets Set-1 to Set-4 were printed, in a printing order "black-cyan-magenta-yellow", with the custom built single pass inkjet printer at the printing speeds of 35 m/min and 50 m/min on a substantially non-absorbing ink-jet ink-receiver HIFI. If the inkjet ink was partially UV cured after it landed on the ink receiver, the time delay before partial curing was given is shown in Table 13. All inkjet inks received a final curing, which was respectively 1728 ms and 2469 ms after jetting of the first inkjet ink for a printing speed of respectively of 50 m/min and 35 m/min. Bleeding, coalescence and gloss were evaluated on all printed samples and the results are shown in Table 13.

TABLE 13

| Printed Sample | Inkset | Printing speed (m/min) | Partial UV curing (ms) | Bleeding | Coalescence | Gloss |
|---|---|---|---|---|---|---|
| COMP-1 | Set-1 | 50 | none | −−− | −− | −− |
| COMP-2 | | | 138 | − | − | ++ |
| COMP-3 | | | 414 | −− | −− | ++ |
| COMP-4 | | | 690 | −− | −− | − |
| COMP-5 | | | 966 | −− | −− | −− |
| COMP-6 | | 35 | none | −−− | −−− | −− |
| COMP-7 | | | 197 | −− | − | ++ |
| COMP-8 | | | 591 | −− | −− | ++ |
| COMP-9 | | | 986 | −− | −− | − |
| COMP-10 | | | 1380 | −− | −− | −− |
| COMP-11 | Set-2 | 50 | none | − | −− | −− |
| COMP-12 | | | 138 | − | − | ++ |
| COMP-13 | | | 414 | − | + | + |
| COMP-14 | | | 690 | − | − | − |
| COMP-15 | | | 966 | − | − | −− |
| COMP-16 | | 35 | none | − | −− | −− |
| COMP-17 | | | 197 | + | − | ++ |
| COMP-18 | | | 591 | − | − | ++ |
| COMP-19 | | | 986 | − | − | + |
| COMP-20 | | | 1380 | − | − | −− |
| COMP-21 | Set-3 | 50 | none | − | − | −− |
| INV-1 | | | 138 | + | + | ++ |
| INV-2 | | | 414 | + | + | ++ |
| COMP-22 | | | 690 | − | − | + |
| COMP-23 | | | 966 | + | − | −− |
| COMP-24 | | 35 | none | − | − | −− |
| INV-3 | | | 197 | + | + | ++ |
| COMP-25 | | | 591 | ++ | + | ++ |
| COMP-26 | | | 986 | ++ | − | + |
| COMP-27 | | | 1380 | − | − | −− |
| COMP-28 | Set-4 | 50 | none | − | − | −− |
| INV-4 | | | 138 | ++ | + | ++ |
| INV-5 | | | 414 | + | + | ++ |
| COMP-29 | | | 690 | ++ | + | ++ |
| COMP-30 | | | 966 | + | − | −− |
| COMP-31 | | 35 | none | − | − | −− |
| INV-6 | | | 197 | ++ | + | ++ |
| COMP-32 | | | 591 | + | − | ++ |
| COMP-33 | | | 986 | − | − | + |
| COMP-34 | | | 1380 | + | − | −− |

From Table 13, it should be clear that only the ink sets Set-3 and Set-4, wherein all the radiation curable inkjet inks had a dynamic surface tension of no more than 30 mN/m, were capable of producing printed samples exhibiting a superior image quality in the specific time frame for partial UV curing of 50 to 500 ms.

The same printing experiment was repeated except that the substantially non-absorbing ink-jet ink-receiver HIFI was replaced by an absorbing ink-jet ink-receiver IG. Bleeding, coalescence and gloss were again evaluated on all printed samples and the results are shown in Table 14.

TABLE 14

| Printed Sample | Inkset | Printing speed (m/min) | Partial UV curing (ms) | Bleeding | Coalescence | Gloss |
|---|---|---|---|---|---|---|
| COMP-35 | Set-1 | 50 | none | −− | −−− | −− |
| COMP-36 | | | 138 | −− | − | ++ |
| COMP-37 | | | 414 | −− | −− | ++ |
| COMP-38 | | | 690 | −− | −− | − |
| COMP-39 | | | 966 | −− | − | −− |
| COMP-40 | | 35 | none | −− | −−− | −− |
| COMP-41 | | | 197 | −− | − | ++ |
| COMP-42 | | | 591 | −− | −− | ++ |
| COMP-43 | | | 986 | −− | −−− | − |
| COMP-44 | | | 1380 | −− | −−− | −− |
| COMP-45 | Set-2 | 50 | none | −− | −− | −− |

TABLE 14-continued

| Printed Sample | Inkset | Printing speed (m/min) | Partial UV curing (ms) | Bleeding | Coalescence | Gloss |
|---|---|---|---|---|---|---|
| COMP-46 | | | 138 | ++ | + | ++ |
| COMP-47 | | | 414 | - | - | + |
| COMP-48 | | | 690 | -- | -- | - |
| COMP-49 | | | 966 | -- | -- | -- |
| COMP-50 | | 35 | none | -- | -- | -- |
| COMP-51 | | | 197 | ++ | + | ++ |
| COMP-52 | | | 591 | - | - | ++ |
| COMP-53 | | | 986 | - | - | + |
| COMP-54 | | | 1380 | -- | -- | -- |
| COMP-55 | Set-3 | 50 | none | -- | - | -- |
| INV-7 | | | 138 | ++ | + | ++ |
| INV-8 | | | 414 | ++ | + | ++ |
| COMP-56 | | | 690 | ++ | + | + |
| COMP-57 | | | 966 | - | -- | -- |
| COMP-58 | | 35 | none | -- | - | -- |
| INV-9 | | | 197 | ++ | + | ++ |
| COMP-59 | | | 591 | ++ | + | ++ |
| COMP-60 | | | 986 | + | + | + |
| COMP-61 | | | 1380 | - | -- | -- |
| COMP-62 | Set-4 | 50 | none | -- | ++ | -- |
| INV-10 | | | 138 | ++ | ++ | ++ |
| INV-11 | | | 414 | ++ | + | + |
| COMP-63 | | | 690 | - | - | ++ |
| COMP-64 | | | 966 | - | - | -- |
| COMP-65 | | 35 | none | -- | + | -- |
| INV-12 | | | 197 | ++ | ++ | ++ |
| COMP-66 | | | 591 | + | ++ | ++ |
| COMP-67 | | | 986 | ++ | - | + |
| COMP-68 | | | 1380 | - | - | -- |

From Table 14, it should be clear that again only the ink sets Set-3 and Set-4 were capable of producing printed samples exhibiting a superior image quality. Although the use of an absorbing ink-jet ink-receiver IG is more forgiving, such that even some good results were obtained outside the specific time frame for partial UV curing of 50 to 500 ms or with inks having a higher dynamic surface tension than 30 mN/m.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A single pass inkjet printing method comprising the steps of:

providing a radiation curable inkjet ink set including at least a first radiation curable inkjet ink and a second radiation curable inkjet ink each having a dynamic surface tension of no more than 30 mN/m as measured by maximum bubble pressure tensiometry at a surface age of 50 ms and at 25° C.;

jetting the first radiation curable inkjet ink onto an ink receiver moving at a speed of at least 35 m/min.;

at least partially curing the first radiation curable inkjet ink on the ink receiver within a time range of 40 ms to 500 ms after the first radiation curable inkjet ink first landed on the ink receiver;

jetting the second radiation curable inkjet ink onto the at least partially cured first radiation curable inkjet ink; and at least partially curing the second radiation curable inkjet ink within a time range of 40 ms to 500 ms after the second radiation curable inkjet ink first landed on the first radiation curable inkjet ink.

2. The single pass inkjet printing method according to claim 1, wherein the ink receiver is a substantially non-absorbent ink receiver.

3. The single pass inkjet printing method according to claim 1, wherein the ink receiver is moving at a speed of at least 50 m/min.

4. The single pass inkjet printing method according to claim 1, wherein the first radiation curable inkjet ink is at least partially cured within 200 ms after the first radiation curable inkjet ink first landed on the ink receiver, and/or the second radiation curable inkjet ink is at least partially cured within 200 ms after the second radiation curable inkjet ink first landed on the first radiation curable inkjet ink.

5. The single pass inkjet printing method according to claim 1, wherein the at least partially curing of the first radiation curable inkjet ink starts at least 100 ms after the first radiation curable inkjet ink first landed on the ink receiver and/or the at least partially curing of the second radiation curable inkjet ink starts at least 100 ms after the second radiation curable inkjet ink first landed on the first radiation curable inkjet ink.

6. The single pass inkjet printing method according to claim 1, wherein the first radiation curable inkjet ink and/or the second radiation curable inkjet ink has a static surface tension of no more than 24 mN/m.

7. The single pass inkjet printing method according to claim 1, further comprising the step of finally curing the at least partially cured first radiation curable inkjet ink within 2.5 s after the first radiation curable inkjet ink first landed on the ink receiver and/or finally curing the at least partially cured second radiation curable inkjet within 2.5 s after the second radiation curable inkjet ink first landed on the first radiation curable inkjet ink.

8. The single pass inkjet printing method according to claim 1, wherein the first radiation curable inkjet ink and/or the second radiation curable inkjet ink contains at least 0.6 wt % of a silicone surfactant based on a total weight of the radiation curable inkjet ink.

9. The single pass inkjet printing method according to claim 8, wherein the silicone surfactant is a polyether modified polydimethylsiloxane surfactant.

10. The single pass inkjet printing method according to claim 8, wherein the silicone surfactant is a polymerizable silicone surfactant.

11. The single pass inkjet printing method according to claim 10, wherein the polymerizable silicone surfactant is a silicone modified (meth)acrylate or a (meth)acrylated siloxane.

12. An apparatus that performs the single pass inkjet printing method according to claim 1.

13. The apparatus according to claim 12, wherein the at least partial curing is performed by UV LEDs.

14. The apparatus according to claim 12, wherein the final curing is performed by e-beams or by a mercury vapor lamp.

15. The apparatus according to claim 12, wherein the final curing is performed by e-beams or by a mercury vapor lamp.

* * * * *